US010027619B2

(12) United States Patent
Backholm et al.

(10) Patent No.: US 10,027,619 B2
(45) Date of Patent: *Jul. 17, 2018

(54) MESSAGING CENTRE FOR FORWARDING E-MAIL

(71) Applicant: Seven Networks, LLC, Marshall, TX (US)

(72) Inventors: Ari Backholm, San Carlos, CA (US); Seppo Salorinne, Helsinki (FI); Antti Saarilahti, Helsinki (FI); Marko Ketonen, Helsinki (FI); Lauri Vuornos, Helsinki (FI); Petri Salmi, Espoo (FI)

(73) Assignee: Seven Networks, LLC, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/609,189

(22) Filed: Jan. 29, 2015

(65) Prior Publication Data

US 2015/0149575 A1 May 28, 2015

Related U.S. Application Data

(60) Continuation of application No. 12/228,325, filed on Aug. 11, 2008, now abandoned, which is a division of
(Continued)

(30) Foreign Application Priority Data

Nov. 22, 2004 (FI) ..................................... 20045451

(51) Int. Cl.
G06F 15/16 (2006.01)
H04L 12/58 (2006.01)
(Continued)

(52) U.S. Cl.
CPC .......... *H04L 51/38* (2013.01); *H04L 63/0428* (2013.01); *H04L 63/08* (2013.01);
(Continued)

(58) Field of Classification Search
CPC ...... G06Q 10/107; H04L 12/585; H04L 12/58
(Continued)

(56) References Cited

U.S. PATENT DOCUMENTS 6,078,908 A 6/2000 Schmitz
6,745,326 B1 6/2004 Wary
(Continued)

FOREIGN PATENT DOCUMENTS

EP 0772327 A2 6/2005

OTHER PUBLICATIONS

Final Office Action dated May 1, 2009 for U.S. Appl. No. 11/282,607.
(Continued)

*Primary Examiner* — Alan S Chou
(74) *Attorney, Agent, or Firm* — NK Patent Law, PLLC

(57) ABSTRACT

A method for forwarding an e-mail message from an e-mail server to a mobile terminal is provided. An e-mail address of the mobile terminal is associated with an identifier and encryption information, receiving the e-mail message associated with the e-mail address and sent by the e-mail server. The method includes encrypting the e-mail message using the encryption information associated with the e-mail address and transmitting the encrypted e-mail message to the mobile terminal.

52 Claims, 4 Drawing Sheets

Related U.S. Application Data application No. 11/282,950, filed on Nov. 21, 2005, now Pat. No. 7,643,818.

(60) Provisional application No. 60/650,975, filed on Feb. 9, 2005.

(51) Int. Cl.
| | |
|---|---|
| *H04L 29/06* | (2006.01) |
| *H04W 12/02* | (2009.01) |
| *H04W 12/06* | (2009.01) |
| *H04W 4/12* | (2009.01) |
| *H04W 8/26* | (2009.01) |

(52) U.S. Cl.
CPC ............ *H04L 63/18* (2013.01); *H04W 12/02* (2013.01); *H04W 12/06* (2013.01); *H04W 4/12* (2013.01); *H04W 8/26* (2013.01)

(58) Field of Classification Search
USPC ........................................................ 709/206
See application file for complete search history.

(56) References Cited

U.S. PATENT DOCUMENTS

| | | | |
|---|---|---|---|
| 6,993,658 B1 | 1/2006 | Engberg et al. | |
| 7,289,792 B1* | 10/2007 | Turunen | H04L 12/5895 370/254 |
| 2002/0147918 A1* | 10/2002 | Osthoff | G06F 21/71 713/193 |
| 2004/0098597 A1* | 5/2004 | Giobbi | G06F 21/10 713/185 |
| 2004/0205248 A1* | 10/2004 | Little | H04L 63/0428 709/246 |
| 2005/0015432 A1 | 1/2005 | Cohen | |
| 2005/0139680 A1* | 6/2005 | Anttila | G06K 1/18 235/462.46 |
| 2005/0152525 A1* | 7/2005 | Kent, Jr. | H04M 3/42374 379/207.02 |
| 2006/0031300 A1* | 2/2006 | Kock | G06Q 10/107 709/206 |
| 2006/0085503 A1 | 4/2006 | Stoye | |
| 2006/0265595 A1 | 11/2006 | Scottodiluzio | |
| 2013/0268384 A1* | 10/2013 | Salonen | G06Q 10/02 705/26.1 |

OTHER PUBLICATIONS

Non-final Office Action dated Nov. 19, 2008 for U.S. Appl. No. 11/282,607.
Non-final Office Action dated Feb. 5, 2008 for U.S. Appl. No. 11/282,607.
Final Office Action dated Apr. 3, 2009 for U.S. Appl. No. 11/282,950.
Non-final Office Action dated Sep. 26, 2008 for U.S. Appl. No. 11/282,950.
Final Office Action dated Dec. 4, 2013 for U.S. Appl. No. 12/205,747.
Non-final Office Action dated Jun. 17, 2013 for U.S. Appl. No. 12/205,747.
Final Office Action dated Nov. 8, 2011 for U.S. Appl. No. 12/205,747.
Non-final Office Action dated Apr. 19, 2011 for U.S. Appl. No. 12/205,747.
Non-final Office Action dated Jan. 15, 2015 for U.S. Appl. No. 12/228,325.
Final Office Action dated Apr. 1, 2014 for U.S. Appl. No. 12/228,325.
Non-final Office Action dated Jun. 3, 2013 for U.S. Appl. No. 12/228,325.
Final Office Action dated Dec. 20, 2012 for U.S. Appl. No. 12/228,325.
Non-final Office Action dated May 16, 2012 for U.S. Appl. No. 12/228,325.
Final Office Action dated May 11, 2011 for U.S. Appl. No. 12/228,325.
Non-final Office Action dated Nov. 4, 2010 for U.S. Appl. No. 12/228,325.
Final Office Action dated Oct. 7, 2009 for U.S. Appl. No. 12/228,424.
Non-final Office Action dated Jun. 2, 2009 for U.S. Appl. No. 12/228,424.
EPO, Application No. 05813041.0, File history from Nov. 21, 2005 to Apr. 7, 2016.
EPO, Application No. 05813045.1, File history from Nov. 21, 2005 to Apr. 7, 2016.
Willis, Will, et al, Implementing and Managing Microsoft Exchange Server 2003, Self-Paced Training Kit, Microsoft, http://www.post.ir/_ITCenter/Documents/c4b0ff43-0235-4e62-a615-818f6834989a.pdf, pp. 1-826, Microsoft Press, Redmond, WA.
Microsoft, Exchange Server 2003 Features Comparison, https://www.microsoft.com/middleeast/windowsserversystem/exchange/evaluationifeatures/ex_compare.mspx, Updated: May 25, 2004, pp. 1-6.
Microsoft Exchange, Exchange Server Version and Features—TechNet Articles—United States (English)—TechNet Wiki, https://social.technet.microsoft.com/wiki/contents/articles/346.exchange-server-version-and-features.aspx, First Published: Mar. 9, 2010; Last Revision: Dec. 11, 2016, pp. 1-3.
Microsoft, Exchange Documentation Team, Exchange Server 2003 Administrative Guide, Microsoft Windows Server System, http://www.pc-hulp-online.nl/upload/
Microsoft_Exchange_Server_2003_Administration_Guide.pdf, Sep. 2003, pp. 1-503.
Fajman, R., RFC 2298—An Extensible Message Format for Message Disposition Notifications, National Institutes of Health, Mar. 1998, pp. 1-29, Network Working Group, 2998, Standard Track.
Crispin, M., RFC 3501—Internet Message Access Protocol—Version 4rev1, University of Washington, Mar. 2003, pp. 1-109, Network Working Group, 3501, Obsoletes: 2060, Standard Track.
Hansen, Ed., T., et al., RFC 3798—Message Disposition Notification, AT&T Laboratories, Lucent Technologies, May 2004, pp. 1-31, Network Working Group, 3798, Obsoletes: 2298, Standard Track.

* cited by examiner

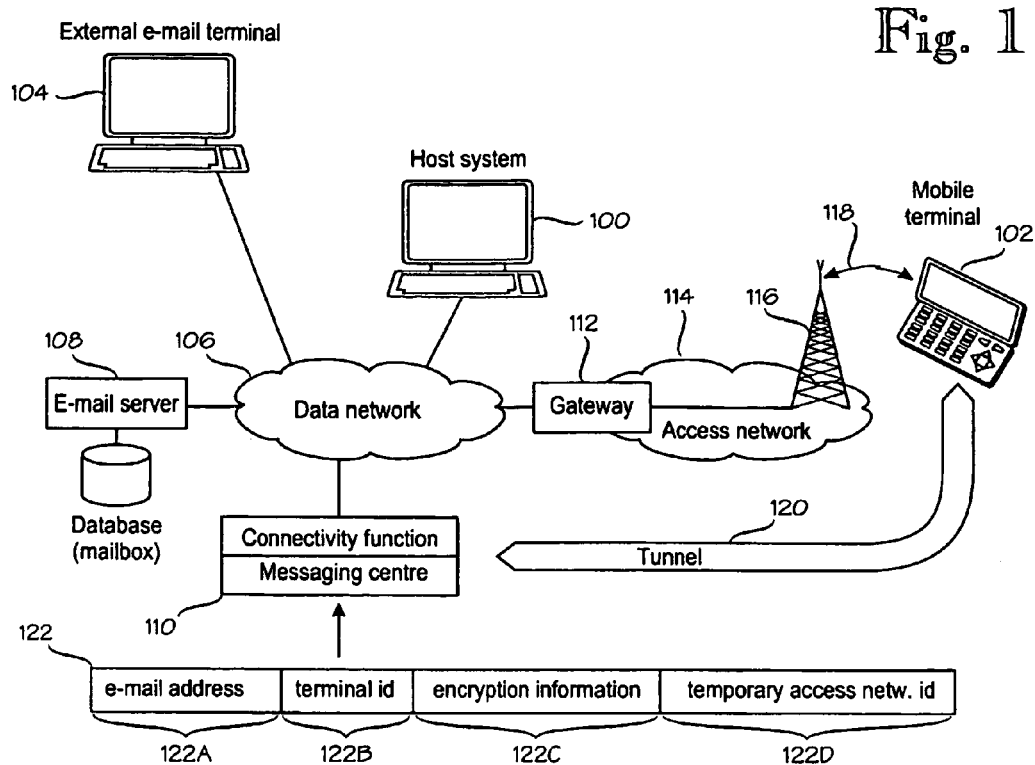
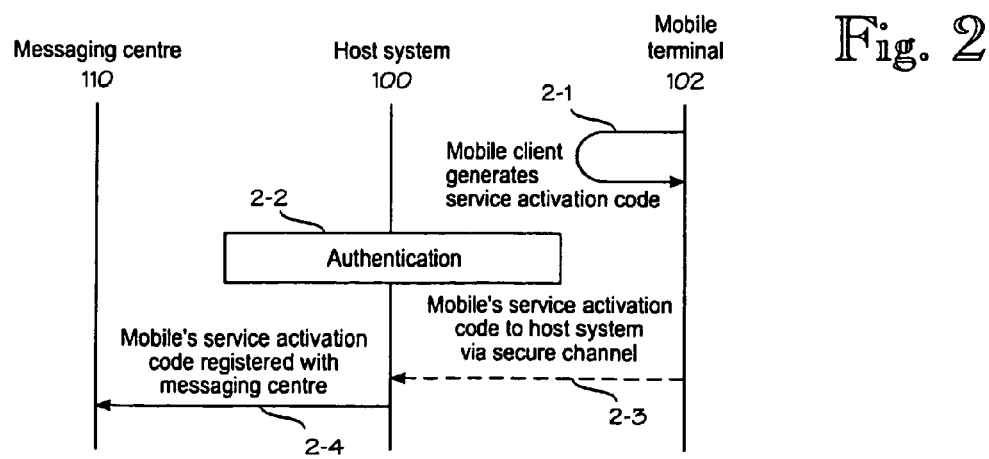

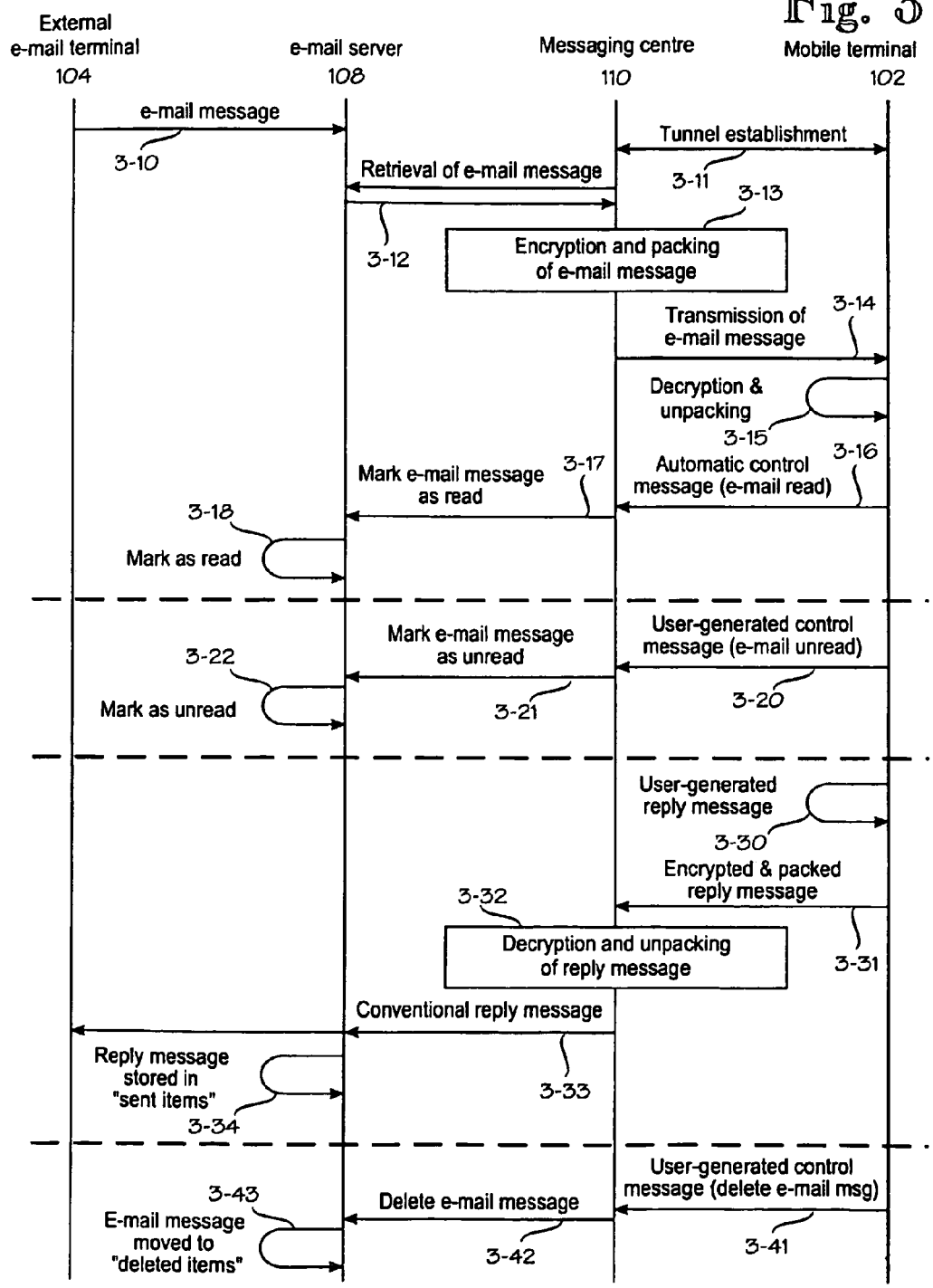

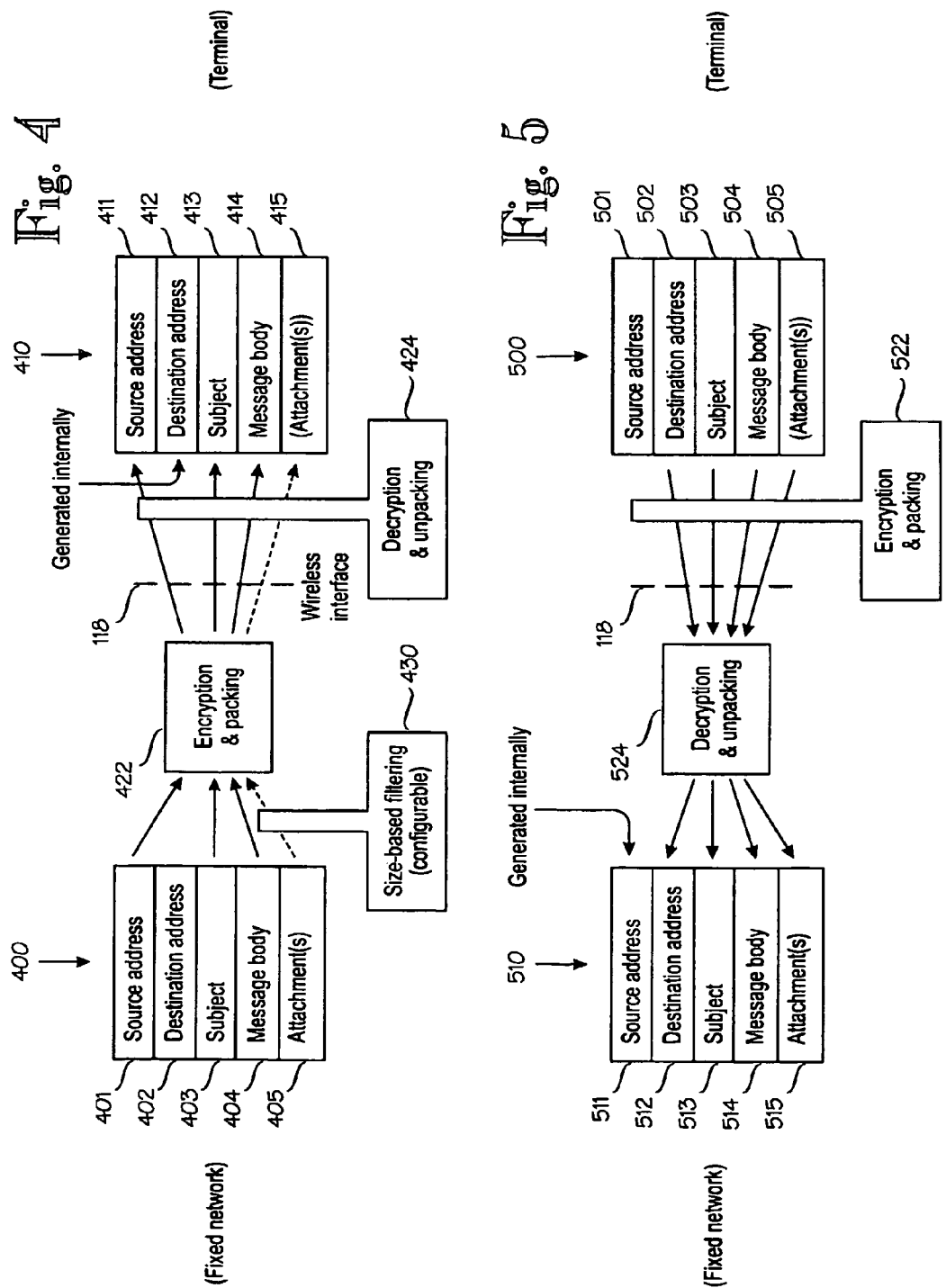

MESSAGING CENTRE FOR FORWARDING E-MAIL

CROSS-REFERENCE TO RELATED APPLICATIONS

This application is a continuation of U.S. patent application Ser. No. 12/228,325 filed Aug. 11, 2008, which is a divisional and claims the priority benefit of U.S. patent application Ser. No. 11/282,950 filed Nov. 21, 2005, which claims the priority benefit of U.S. provisional patent application No. 60/650,975 filed Feb. 9, 2005 and the priority benefit of Finnish patent application number 20045451 filed Nov. 22, 2004, the disclosures of the aforementioned applications being incorporated herein by reference.

BACKGROUND OF THE INVENTION

Field of the Invention

The invention relates to methods and equipment for transmitting electronic mail (e-mail) messages to or from a mobile terminal. More specifically, the present invention relates to a messaging centre for transmitting e-mail messages to and from a mobile terminal.

Description of the Related Art

U.S. Pat. No. 6,701,378 to Barry Gilhuly et al. discloses a system and method for pushing information, such as e-mail messages, from a host system to a mobile data communication device (mobile terminal). The technique permits e-mail processing at a mobile terminal in addition to a more stationary computer, referred to as a host system in the Gilhuly patent. Specifically, a redirector program operating at the host system enables a user to continuously redirect certain user-selected data items from the host system to the user's mobile data communication device upon detecting that one or more user-defined triggering events has occurred. The redirector program operates in connection with event-generating applications and repackaging systems at the host system to configure and detect a particular user-defined event, and then to repackage the user-selected data items in an electronic wrapper prior to pushing the data items to the mobile device. The mobile data communication device may originate new messages or reply messages to previously received information, such messages being transmitted to a wireless redirector host system, which then transmits a copy of the messages to both the intended recipient and a first electronic mail account associated with the mobile data communication device.

The above-described prior art technique suffers from certain limitations. For example, the host system, such as an office computer, and the mobile terminal require separate e-mail accounts. Some e-mail systems support a forward-type file for forwarding e-mail messages from a first e-mail account to a second e-mail account, but some systems do not support it. It is difficult to set up e-mail systems that do not support such forwarding techniques.

Furthermore, the Gilhuly patent does not address issues that relate to manipulating e-mail messages at the second e-mail account (at the mobile terminal). For instance, it is difficult or impossible to use the terminal to arrange incoming e-mail messages into different folders at the host system. Also, if the terminal user deletes an incoming e-mail message at the terminal, a copy of the deleted message is not present in a "deleted items" folder at the host system, which typically is the case in e-mail systems. Likewise, when the terminal sends an e-mail message, a copy of the message is not added to the host system's "sent items" folder. A further related problem is that e-mail messages that the user has read at the terminal may appear as unread messages at the host system.

Yet another problem is that configuring an e-mail client software at the mobile terminal is difficult because of user interface restrictions in typical mobile terminals.

SUMMARY OF THE INVENTION

Embodiments of the present invention provide for methods and systems for messaging centres for forwarding an e-mail message from an e-mail server. A permanent terminal identifier of the mobile-terminal and an associated temporary identifier of the mobile terminal may be stored. An e-mail message including an indication of a permanent identifier of the mobile terminal may be received. The e-mail message may then be transmitted to the mobile terminal using the temporary identifier associated with the permanent identifier of the mobile terminal.

Various embodiments of the present invention include methods for forwarding an e-mail message from an e-mail server to a mobile terminal. Such methods may include storing a permanent terminal identifier of the mobile terminal and an associated temporary identifier of the mobile terminal, receiving the e-mail message, wherein the e-mail message includes an indication of the permanent terminal identifier, and transmitting the e-mail address to the mobile terminal using the temporary identifier associated with the permanent identifier of the mobile terminal. Some embodiments may further include storing the e-mail address of the e-mail message in association with the stored permanent and temporary identifier of the mobile terminal. The message may have been encrypted, packed, and received from a connectivity application in some embodiments of the present invention. The mobile terminal receiving the e-mail message may decrypt and unpack the message.

Some embodiments of the present invention further include a system of a memory for storing a permanent identifier of the mobile terminal and an associated temporary identifier of the mobile terminal, a processor configured to execute software stored in memory, the execution of the software resulting in the identification of the mobile terminal based on a received e-mail message including an indication of the permanent identifier of the mobile terminal and the stored association between the permanent identifier and the temporary identifier of the mobile terminal, and a communications interface configured to transmit the e-mail message to the identified mobile terminal.

Some embodiments may further include a computer-readable storage media upon which is embodied programs including instructions for performing methods for forwarding an e-mail message from an e-mail server.

BRIEF DESCRIPTION OF THE DRAWINGS

In the following the invention will be described in greater detail by means of preferred embodiments with reference to the attached drawings, in which FIG. 1 shows an exemplary system architecture in which the invention can be used;

FIG. 2 shows provisioning of an e-mail system;

FIG. 3 shows a hypothetical scenario in which the e-mail system is used;

FIG. 4 shows information flows in mobile-terminated e-mail transmission;

FIG. 5 shows information flows in mobile-originated e-mail transmission;

DETAILED DESCRIPTION

Figure 6:
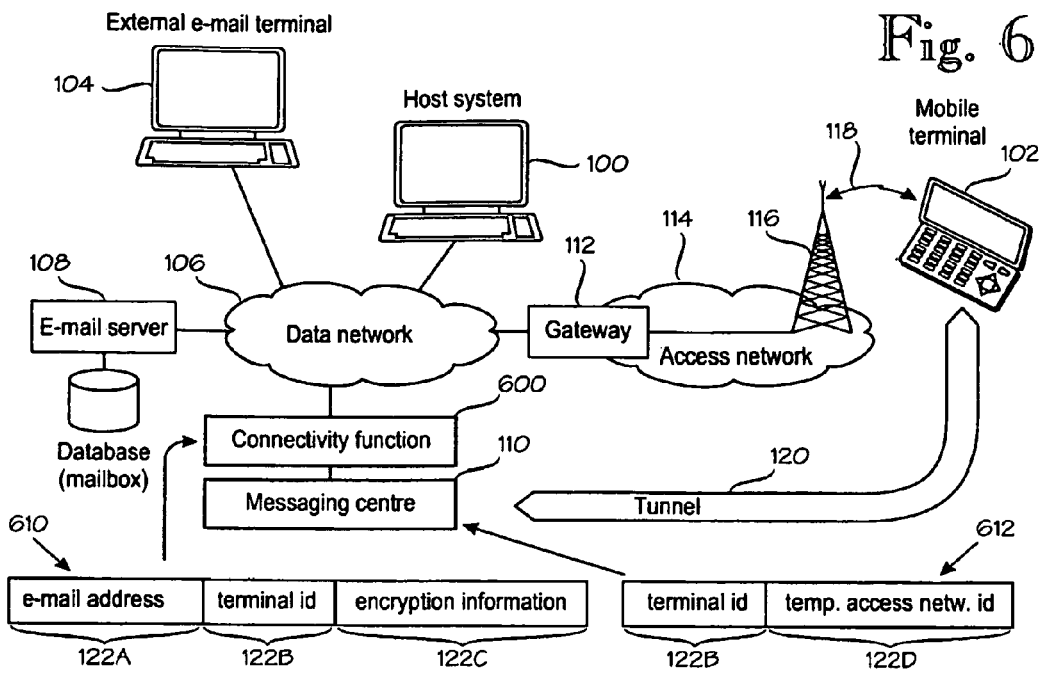
FIG. 6 shows an enhanced embodiment in which some of the functions of the messaging centre are performed by a separate connectivity function.

FIG. 1 shows an exemplary system architecture in which the invention can be used. Reference numeral 100 denotes a host system that is able to send an receive e-mail messages. Reference numeral 102 denotes a mobile terminal, also able to send an receive e-mail messages. The e-mail messages may originate or terminate at external e-mail terminals, one of which is denoted by reference numeral 104. The invention aims at improving cooperation between the host system 100 and mobile terminal 102 such that they can use a single e-mail account as transparently as possible. This means, for example, that the users of the external e-mail terminals 104, when sending or receiving e-mail, do not need to know if the user of the host system 100 actually uses the host system 100 or the mobile terminal 102 to communicate via e-mail. The transparency also means that e-mail manipulation at the mobile terminal 102 has, as far as possible, the same effect as the corresponding e-mail manipulation at the host system 100. For example, e-mail messages read at the mobile terminal 102 should preferably be marked as read at the host system.

Reference numeral 106 denotes a data network, such as an IP (Internet Protocol) network, which may be the common Internet or its closed subnetworks, commonly called intranets or extranets. Reference numeral 108 denotes an e-mail server and its associated database. The database stores an e-mail account, addressable by means of an e-mail address, that appears as a mailbox to the owner of the e-mail account. In order to communicate with mobile terminals 102, the data network 106 is connected, via a gateway 112 to an access network 114. The access network comprises a set of base stations 116 to provide wireless coverage over a wireless interface 118 to the mobile terminals 102.

Reference numeral 110 denotes a messaging centre that is largely responsible for providing the above-mentioned transparency between the host system 100 and the mobile terminal 102. The system architecture also comprises a connectivity function, whose task is to push e-mail messages to the mobile terminal. In the embodiment shown in FIG. 1, the connectivity function is considered a physically integral but logically distinct element of the messaging centre 110. Later, in connection with FIGS. 6 and 7, an enhanced embodiment will be described that explicitly assigns the security-related functions to the connectivity function and traffic-related functions to the messaging centre 110.

The mobile terminal 102 may be a pocket or laptop computer with a radio interface, a smart cellular telephone, or the like. Depending on implementation, the host system 100, if present, may have different roles. In some implementations the host system 100 is optional and may be a conventional office computer that merely acts as the mobile terminal user's principal computer and e-mail terminal. In other implementations the host system may act as a platform for a single user's connectivity function, in addition to being an office computer. In yet other implementations the host system 100 may comprise the connectivity function for several users. Thus it is a server instead of a normal office computer.

We assume here that the access network 114 is able to establish and maintain a tunnel 120 between the messaging centre 110 and the mobile terminal 102. For instance, the tunnel may be set up using GPRS Tunneling Protocol (GTP) or its later derivatives, or any other suitable tunneling protocol.

In a real system, there are naturally a large number of mobile terminals 102 and tunnels 120. In order to keep track of which e-mail account and which tunnel belongs to which mobile terminal, the messaging centre 110 maintains an association 122 for each mobile terminal supported by it. Each association 122 joins three fields, namely an e-mail address 122A assigned to the mobile terminal or its user, encryption information 122C and a temporary wireless identity 122D of the mobile terminal in the access network. The embodiment shown in FIG. 1 also employs a terminal identifier 122B which may be the same as the e-mail address 122A of the mobile terminal 102, in which case the association 122 actually associates three information items. Alternatively, the terminal identifier 122B may be an identifier arbitrarily assigned to the mobile terminal. In a preferred implementation the terminal identifier 122B is the mobile terminal's equipment identifier or its derivative. The encryption information 122C will be generated by the mobile terminal, as described later in connection with FIG. 2. The temporary wireless identity 122D may be the identifier of the tunnel to the mobile station. Of course, the tunnel identifier is not permanent and is only known when a tunnel exists. The creation and use of the association 122 will be further described in connection with FIGS. 2, 3 and 6.

FIG. 2 shows provisioning of an e-mail system in a system as shown in FIG. 1. The e-mail provisioning phase comprises the following steps. In a preparatory step (not shown), appropriate e-mail software is installed in the host system 100 (if present) and mobile terminal 102, as well as in the e-mail server 108. For instance, the host system 100, the mobile terminal 102 and the e-mail server 108 may comprise and execute conventional e-mail software, such as Microsoft®. Outlook, which may be augmented by inventive client software that will be described in more detail whenever necessary.

After the software installation, the next task is to create a secure binding between the connectivity function and the mobile terminal 102. The idea is to ensure that, in addition to the host system 100, only the mobile terminal 102 used in the binding process can be used to access and manipulate e-mail addressed to the mobile terminal's e-mail address. The binding operation faces two types of security risks. First, the communication used during binding must be secured against eavesdropping or other types of hacking. Second, the only the user of the bound terminal 102 may access e-mail addressed to the e-mail address. The eavesdropping problem is not trivial in a phase in which no trust exists between the mobile terminal 102 and the rest of the system. Yet another problem is that the e-mail server 108 and the messaging centre 110 typically have user interfaces that are only accessible to dedicated support persons.

FIG. 2 shows a secure e-mail provisioning technique in which the host system 100 authenticates the user of the mobile terminal 102. In step 2-1 the client software in the mobile terminal 102 generates and displays a service activation code. In step 2-2 the host system 100 authenticates the person who enters the service activation code. Instead of a dedicated authentication step, the technique may rely on the authentication of the underlying e-mail system, such as user name and password combination. After all, the e-mail provisioning need not be more secure than the underlying e-mail system. In step 2-3 the service activation code is then conveyed off-line to the host system 100. The idea of the off-line communication is to eliminate any chance of eavesdropping before secure a communication channel can be established. For instance, the service activation code may be entered manually or via a local connection, such as a wired or optical interface or a short-range wireless interface, such as Bluetooth™. Finally, in step 2-4, the mobile terminal's service activation code is registered with the connectivity function in the messaging centre 110.

The service activation code is closely related to an encryption key to be used in future communications between the connectivity function in the messaging centre 110 and the mobile terminal 102. The service activation code and the encryption key may be identical, or one may be a subset of the other, or the encryption key may be derived from the service activation code by means of some, preferably unpublished, algorithm. The fact that the service activation code and the encryption key are closely related to each other ensures that the terminal used in the authentication process is the terminal used to access the e-mail service afterwards.

Thus the idea of conveying the service activation code to the messaging centre 110 via the host system 100 solves both the security-related and user interface-related problems mentioned above. If there is no host system 100 that can authenticate the mobile terminal and its user. Instead, the user may enter the provisioning data to the connectivity function via some suitable connection. The provisioning data entered by the user may be checked by sending a trial e-mail message and attempting to read it. If the check succeeds, it is regarded as the authentication. Yet another way is to convey the service activation code to a dedicated support person who performs the authentication (eg by recognizing the person's face or voice) and enters the service activation code into the connectivity function in the messaging centre 110. The messaging centre/connectivity function 110 now stores an association (item 122 in FIG. 1) between the e-mail address 122A and encryption information 122C.

FIG. 3 shows a hypothetical scenario in which the e-mail system is used. This scenario comprises four events, which are delineated by thick dashed lines. The first event, steps 3-10 through 3-16, relate to incoming e-mail. In step 3-10 the external e-mail terminal 104 sends an e-mail message to the e-mail server 108. The e-mail message is addressed to the user of the host system 100. Accordingly, a notification of the incoming e-mail is sent to the host system 100, but that step is omitted from FIG. 3 as purely conventional. In step 3-11 the mobile terminal 102 requests the access network to establish a tunnel between itself and the messaging centre 110. Step 3-11 may take place before or after step 3-10. After the tunnel establishment, the messaging centre 110 now stores a complete association triplet (item 122 in FIG. 1) that joins the e-mail address 122A of the host system 100, the service activation code 122C of the mobile terminal 102 and the tunnel identifier 122D of the tunnel to the mobile terminal 102.

In step 3-12 the messaging centre 110 detects and retrieves the incoming e-mail from the e-mail server 108. For instance, the messaging centre 110 may regularly poll the e-mail server 108 or it may register itself as a listener to the e-mail server. In step 3-13 the messaging centre 110 encrypts, and optionally packs, the e-mail message or parts of it. For instance, the messaging centre 110 may omit the destination address of the e-mail message because it is self-evident that the e-mail message is addressed to the user of the host system 100, who is also the user of the mobile terminal 102. The messaging centre 110 may also omit all attachments or large attachments, up to some threshold size, from the e-mail message to be conveyed to the mobile terminal. The encryption process uses the mobile terminal's service activation code 122C, or its derivative, as the encryption key. In step 3-14 the messaging centre 110 transmits the encrypted and packed e-mail to the mobile terminal that decrypts and unpacks it in step 3-15. The messaging centre 110 knows the correct encryption key (service activation code) 122C and the tunnel identifier 122D on the basis of the association triplet 122.

In step 3-16 the mobile terminal 102 sends the messaging centre 110 an automatic control message indicating that the user has read the e-mail message. In response to the control message, the messaging centre 110 signals the e-mail server 108 to mark the e-mail message as read in step 3-17, which act the e-mail server performs in step 3-18. The control message comprises some identification of the e-mail message but not its contents, whereby it loads the radio interface only lightly. A benefit of the control message is that the user, when beginning to user the host system 100, immediately sees which messages he/she has already read and does not have to read them twice.

Next in this scenario, the user decides that the e-mail message needs further attention when he/she is at the host system 100. The user may initiate another control message 3-20 and 3-21 that causes the previously read message to be marked as unread at the e-mail server in step 3-22.

The next phase, steps 3-30 through 3-34, relates to e-mail message generation at the mobile terminal 102. We assume here, that the e-mail message to be generated is a reply message to the incoming message described above (steps 3-10 to 3-17), but the operation is very similar if the message to be generated is an original (non-reply) message. In step 3-30 the mobile terminal user generates a reply message. Since it is a reply message, its recipient is automatically the sender of the incoming message, and the subject field comprises the original subject with a prefix of "RE:" or something similar. If the message is not a reply message, the user will have to fill in the recipient and subject fields. In step 3-31 the client software at the mobile terminal 102 encrypts, and optionally packs, the outgoing e-mail message and transmits it via the tunnel to the messaging centre 110. The messaging centre 110 does not immediately know the sender of the e-mail message or the required decryption key. But the messaging centre 110 does know the identifier of the tunnel 120, and it employs the association triplet 122 to retrieve the decryption key 122C and the mobile terminal user's e-mail address 122A. The latter is not included in the e-mail message transmitted over the wireless interface 118 in order to load the wireless interface as little as possible. In step 3-32, the messaging centre 110 employs the decryption key 122C to decrypt the e-mail message. It also inserts the mobile terminal user's e-mail address 122A, which is the same as the host system's e-mail address because they share the same e-mail account. In step 3-33 the messaging centre 110 signals the e-mail server 108 to send a conventional reply message. In step 3-34 the e-mail server 108 stores a copy of the message in its "sent items" folder. Because the messaging centre 110 signals the e-mail server 108 to send a conventional reply message, the recipient of the message has no way of knowing that the user actually used the mobile terminal to initiate the message, and the desired transparency is achieved. A benefit of the transparency is that when the external terminal 104 sends a further reply, its user does not need to decide whether to send the reply to the host system or to the mobile terminal.

The final phase, steps 3-41 to 3-43, relate to deletion of an e-mail message. In response to the mobile terminal user's deletion command, the mobile terminal 102 sends a control message in step 3-41 to the messaging centre 110. In step 3-42 it signals the e-mail server 108 to delete the message, and in step 3-43 the message is moved to the "deleted items" folder, again achieving complete transparency between the host system and the mobile terminal.

As a further example of control messages, the user of the mobile terminal 102 may wish to explicitly move an e-mail message to a particular folder. In this case the signalling is analogous to steps 3-41 to 3-43, except that the message is not deleted but moved to a different folder. Only the control message has to be sent via the wireless interface, not the actual e-mail message.

FIG. 4 shows information flows in mobile-terminated e-mail transmission. Reference numeral 400 denotes an e-mail message as it appears on the fixed network side of the wireless interface 118. The e-mail message 400 is sent by an external e-mail terminal 104 and processed by the host system 100, the e-mail server 108 and/or the messaging centre 110. For the purposes of this description it comprises a source address field 401, a destination address field 402, a subject field 403, a message body field 404 and, optionally, one or more attachments 405. There may be other fields, such as cc (carbon copy) or bcc (blind carbon copy) but they can be ignored in this discussion.

The messaging centre 110 comprises an encryption and packing logic 422 that encrypts, and optionally packs (compresses), most of the fields of the e-mail message 400. However, the destination address field 402 is not processed because the mobile terminal will generate it internally. The mobile terminal comprises a decryption and unpacking logic 424 whose operation is inverse to the encryption and packing logic 422.

It is also advantageous to implement a filtering logic 430 that filters out attachments that exceed a threshold size, which is preferably user-settable. This means that the user is able to set an upper limit for attachments that will be sent to the mobile terminal. Omitting attachments saves resources in the wireless interface and the mobile terminal. Instead of filtering long attachments, or in addition to it, the filtering logic 430 may be configured to cut out portions of an e-mail message body that exceeds a threshold size. Reference numeral 410 denotes the e-mail message as received and processed by the mobile terminal. Instead of size-based filtering, or in addition to it, the filtering logic may employ type-based filtering that filters out attachment types that the mobile terminal is not able to process. For instance, if the mobile terminal does not have a suitable codec for certain types of video clips, it is pointless to send such video clips to the mobile terminal.

FIG. 5 shows information flows in mobile-originated e-mail transmission. Reference numeral 500 denotes an e-mail message generated at the mobile terminal in response to a user input received via the terminal's user interface. The e-mail message 500 is encrypted, and optionally packed, by an encryption and packing logic 522 that operates similarly to the logic 422 in the messaging centre. Reference numeral 510 denotes the same e-mail message after processing by a decryption and unpacking logic 524 that reverses the encryption and packing by the logic 522.

The information flows in FIG. 5 are largely analogous to those in FIG. 4, and a detailed description is omitted. However, in this direction the source address, instead of the destination address, is omitted from the packet sent over the wireless interface. In either direction, the e-mail address shared between the host system 100 and the mobile terminal 102 is not transmitted over the wireless interface. Another difference to FIG. 4 is absence of the size/type-based filtering logic 430, because in mobile-originated messages the user can each time make the decision whether or not to include attachments.

FIG. 6 shows an enhanced embodiment in which some of the functions of the messaging centre are performed by a separate connectivity function. In the embodiments described so far the messaging centre 110 was responsible for data security issues and traffic coordination to/from the access network. In the embodiment shown in FIG. 6 a dedicated connectivity function 600 is responsible for the data security issues. FIG. 6 shows an arrangement in which the connectivity function 600 is physically attached to or co-located with the messaging centre 110, but they are logically separate elements. Indeed, a definite advantage of the separate connectivity function 600 is that it can be detached from the messaging centre, for instance, within the company that owns the host system 100 or the e-mail server 108. For a small number of users, the connectivity function 600 can be installed in each host system 100, or the host system 100 can be interpreted as a separate server configured to support multiple users. It is even possible to implement some or all the above-mentioned options. This means, for example, that there is one or more messaging centres 110 that offer services to several network operators, or they may be a dedicated messaging centre for each network operator (somewhat analogous to short messaging centres). Each messaging centre 110 may have an integral connectivity function 600 to support users who don't wish to install a separate connectivity function in a host system 100. For users who do install a separate connectivity function 600 in their host systems 100, such connectivity functions bypass the connectivity function in the messaging centre 110 and address the messaging centre 110 directly.

In the embodiment shown in FIGS. 1 to 3, the messaging centre maintained an association 122 that joined the e-mail address 122A, terminal identifier 122B (which may or may not be the same as the e-mail address), encryption information 122C and the temporary wireless identity 122D of the mobile terminal. In the embodiment shown in FIGS. 6 and 7, the association is split into two, such that the connectivity function 600 maintains a first association 610 between the e-mail address 122A, terminal identifier 122B and the encryption information 122C, while the messaging centre 110 maintains a second association 612 between the terminal identifier 122B (or e-mail address 122A) and the temporary wireless identity 122D of the mobile terminal. Thus in this embodiment the messaging centre 110 does not know or need to know the encryption information 122C, which means that it only forwards traffic without being able to interpret it.

A further change caused by the separation (at least logical and, optionally, physical separation) of the connectivity function 600 from the messaging centre 110 is the fact that in step 2-4 of FIG. 2, the mobile terminal's activation code (or any encryption information based on it) is not delivered to the messaging centre 110 but to the connectivity function 600.

Figure 7:
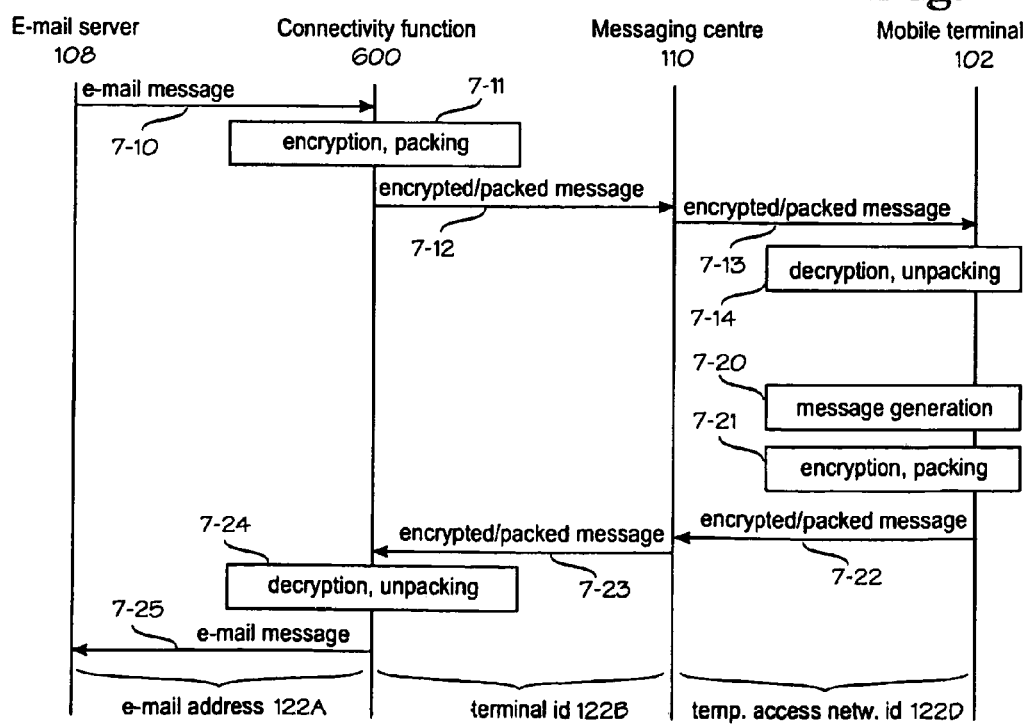
FIG. 7 shows traffic flow in the embodiment shown in FIG. 6.

FIG. 7 shows traffic flow in the embodiment shown in FIG. 6. An extensive messaging scenario was described in connection with FIG. 3, and the description of FIG. 7 is restricted to the differences caused by the separate connectivity function. In step 7-10, the e-mail server 108 sends an incoming e-mail message to the connectivity function 600 (cf. steps 3-10 and 3-12 in FIG. 3). In step 7-11, the connectivity function 600 encrypts, and optionally packs, the e-mail message. The packing comprises one or more of the following: data compression, omission of redundant fields, omission of long attachments and shortening message bodies (cf. step 3-13 in FIG. 3 and items 422 and 430 in FIG. 4). In step 7-12, the connectivity function 600 sends the encrypted and packed e-mail message to the messaging centre 110. Up to this point, the recipient of the e-mail message has been identified based on the e-mail address 122A. In step 7-13, the messaging centre 110 forwards the encrypted and packed e-mail message via the access network to the mobile terminal, but in this step the recipient of the e-mail message is identified based on the temporary wireless identity 122D of the mobile terminal. In step 7-14 the mobile terminal decrypts and unpacks the e-mail message. The unpacking comprises data decompression and/or regeneration of redundant fields (cf. step 3-15 in FIG. 3 and item 424 in FIG. 4). Steps 7-20 through 7-25 relate to mobile-originated e-mail transmission, and the steps performed are self-explanatory based on the above descriptions.

As shown on the bottom row of FIG. 7, between the e-mail server 108 and the connectivity function 600, traffic is identified based on the e-mail address 122A. Between the connectivity function 600 and the messaging centre 110 traffic is identified based on the terminal identifier 122B. Finally, between the messaging centre 110 and the mobile terminal 102, traffic is identified based on the temporary wireless identity 122D, such as the tunnel identifier, TLLI or TMSI.

It is readily apparent to a person skilled in the art that, as the technology advances, the inventive concept can be implemented in various ways. The invention and its embodiments are not limited to the examples described above but may vary within the scope of the claims.

We claim:

1. A method for forwarding an e-mail message from one of a plurality of e-mail servers to a mobile terminal, the method comprising:
   receiving, at an intermediary system, an e-mail message associated with an e-mail address of a user of a mobile terminal and sent by one of a plurality of e-mail servers, wherein the e-mail address is associated with an identifier of the mobile terminal, wherein an email account, associated with the email address, is hosted by one of the plurality of e-mail servers, and
   wherein the identifier is generated by the mobile terminal; encrypting the e-mail message using encryption information associated with a temporary identifier,
   wherein the temporary identifier is based on a connection to the mobile terminal; and transmitting the encrypted e-mail message to the mobile terminal;
   receiving, at the intermediary system, an automatic control message from the mobile terminal indicating that the user has read the e-mail message; and
   in response to receiving the automatic control message, signaling the one of a plurality of e-mail servers to mark the e-mail message as read.

2. The method of claim 1, further comprising identifying the mobile terminal based on the e-mail address of the e-mail message and the association with the identifier of the mobile terminal.

3. The method of claim 2, further comprising adding the e-mail address to a reply message sent by the mobile terminal.

4. The method of claim 1, wherein encrypting the e-mail message further comprises packing the e-mail message by omitting at least part of the e-mail message when at least part of the e-mail message exceeds a predetermined size specification.

5. The method of claim 4, wherein size specification is set by a user of the mobile terminal.

6. The method of claim 4, wherein the omitted part of the e-mail message is the e-mail address.

7. The method of claim 4, wherein the mobile terminal unpacks the e-mail message.

8. The method of claim 1, further comprising receiving the encryption information generated by the mobile terminal.

9. The method of claim 1, wherein the encryption information is based on an activation code of the mobile terminal.

10. The method of claim 1, wherein a messaging center transmits the e-mail message to the mobile terminal using the identifier of the mobile terminal.

11. The method of claim 1, wherein mobile terminal receives and decrypts the e-mail message using the encryption information.

12. The method of claim 1, wherein the identifier is associated with the temporary identifier.

13. A system for forwarding an e-mail message from one of a plurality of e-mail servers to a mobile terminal, the system comprising:
    a memory configured for storing at least one of an e-mail address of a user of a mobile terminal, and an identifier;
    wherein the e-mail address is associated with the identifier,
    wherein an email account, associated with the email address, is hosted by one of the plurality of e-mail servers, and
    wherein the mobile terminal generates the identifier, a processor configured for:
    encrypting the e-mail message using encryption information associated with a temporary identifier, wherein the e-mail message is received from one of a plurality of e-mail servers;
    identifying the mobile terminal based on the identifier of the mobile terminal; and
    transmitting the encrypted e-mail message to the identified mobile terminal, wherein the temporary identifier is based on a connection to the mobile terminal;
    receiving, at the intermediary system, an automatic control message from the mobile terminal indicating that the user has read the e-mail message; and
    in response to receiving the automatic control message, signaling the one of a plurality of e-mail servers to mark the e-mail message as read,
    wherein the system is an intermediary system between the plurality of e-mail servers and the mobile terminal.

14. The system of claim 13, wherein the processor is further configured to receive the e-mail message from the one of a plurality of e-mail servers.

15. The system of claim 13, wherein the processor is further configured to receive the encryption information and to provide the encryption information to the memory for storage.

16. The system of claim 13, wherein the processor is further configured to pack the e-mail message.

17. The system of claim 16, wherein the processor is further configured to omit at least part of the e-mail message when the at least part of the e-mail message exceeds a predetermined size specification.

18. The system of claim 17, wherein the processor is further configured to receive user input concerning the size specification.

19. The system of claim 13, wherein the mobile terminal receives and decrypts the e-mail message using the encryption information.

20. The system of claim 19, wherein the mobile terminal unpacks the message.

21. The system of claim 13, wherein the identifier is associated with the temporary identifier.

22. A device comprising:
a radio;
a processor and memory containing instructions executable by the processor whereby the device is operable to:
optically receive information including a displayed service activation code from a remote device;
register the remote device for access to a messaging account using the service activation code;
receive a message for the messaging account;
encrypt the message using an encryption key; and
send the message to the remote device,
wherein the device is authenticated to access the messaging account.

23. The device of claim 22, wherein the information including the service activation code is received by the device in response to user input at the remote device.

24. The device of claim 22, wherein the information including the service activation code is received by the device in an off-line communication.

25. The device of claim 24, wherein the off-line communication involves a local connection.

26. The device of claim 24, wherein the off-line communication prevents eavesdropping of the service activation code.

27. The device of claim 22, wherein the authentication of the device relies on the authentication of the messaging account.

28. The device of claim 27, wherein the authentication of the messaging account includes a username and password.

29. The device of claim 22, wherein the encryption key is the service activation code.

30. The device of claim 22, wherein the encryption key is derived from the service activation code.

31. The device of claim 22, wherein the encryption key is a subset of the service activation code.

32. The device of claim 22, wherein the encryption key is closely related to the service activation code.

33. The device of claim 22, wherein the device is further operable to:
store an association between at least two of the encryption key, the messaging account, an identifier of the remote device, and the service activation code.

34. The device of claim 22, wherein the message is sent to the remote device through an intermediate device.

35. The device of claim 34, wherein the encryption key is associated with a temporary identifier, wherein the temporary identifier is based on a connection to the intermediate device.

36. The device of claim 22, wherein a control message is received from the remote device upon user interaction with the message.

37. A method for sharing a messaging account, the method comprising:
authenticating a device for access to the messaging account;
optically receiving information including a displayed service activation code from a remote device;
registering the remote device for access to the messaging account using the service activation code;
receiving a message for the messaging account;
encrypting the message using an encryption key; and
sending the message to the remote device.

38. The method of claim 37, wherein the information including the service activation code is received by the device in response to user input at the remote device.

39. The method of claim 38, wherein the information including the service activation code is received by the device in an off-line communication.

40. The method of claim 39, wherein the off-line communication prevents eavesdropping of the service activation code.

41. The method of claim 37, wherein the authentication of the device relies on the authentication of the messaging system.

42. The method of claim 41, wherein the authentication of the messaging system includes a username and password.

43. The method of claim 37, wherein the encryption key is the service activation code.

44. The method of claim 37, wherein the encryption key is derived from the service activation code.

45. The method of claim 37, wherein the encryption key is a subset of the service activation code.

46. The method of claim 37, wherein the encryption key is closely related to the service activation code.

47. The method of claim 37, wherein the method further comprises:
storing an association between the encryption key, the messaging account, an identifier of the remote device, and the service activation code.

48. The method of claim 37, wherein the message is sent to the remote device through an intermediate device.

49. The method of claim 37, wherein the encryption key is associated with a temporary identifier, wherein the temporary identifier is based on a connection to the intermediary device.

50. The method of claim 37, wherein a control message is received from the remote device upon user interaction with the message.

51. A non-transient computer-readable medium containing program instructions for causing a device to perform a method, the method comprising:
optically receiving information including a displayed service activation code from a remote device;
registering the remote device for access to a messaging account using the service activation code;
receiving a message for the messaging account;
encrypting the message using an encryption key; and
sending the message to the remote device,
wherein the device is authenticated to access the messaging account.

52. The method of claim 51, wherein a control message is received from the remote device upon user interaction with the message.

* * * * *